US012566762B2

(12) United States Patent
Ertl

(10) Patent No.: US 12,566,762 B2
(45) Date of Patent: Mar. 3, 2026

(54) SPACE EFFICIENT TECHNIQUE FOR ESTIMATING CARDINALITY USING PROBABILISTIC DATA STRUCTURE

(71) Applicant: Dynatrace LLC, Waltham, MA (US)

(72) Inventor: Otmar Ertl, Linz (AT)

(73) Assignee: Dynatrace LLC, Boston, MA (US)

( * ) Notice: Subject to any disclaimer, the term of this patent is extended or adjusted under 35 U.S.C. 154(b) by 0 days.

(21) Appl. No.: 18/814,009

(22) Filed: Aug. 23, 2024

(65) Prior Publication Data

US 2025/0077521 A1     Mar. 6, 2025

Related U.S. Application Data

(60) Provisional application No. 63/613,351, filed on Dec. 21, 2023, provisional application No. 63/535,355, filed on Aug. 30, 2023.

(51) Int. Cl.
*G06F 16/2453* (2019.01)
*G06F 16/2455* (2019.01)

(52) U.S. Cl.
CPC .. *G06F 16/24545* (2019.01); *G06F 16/24554* (2019.01)

(58) Field of Classification Search
None
See application file for complete search history.

(56) References Cited

U.S. PATENT DOCUMENTS

| | | | | |
|---|---|---|---|---|
| 10,824,694 | B1 * | 11/2020 | Gebremariam | ......... G06F 16/90 |
| 2017/0300529 | A1 * | 10/2017 | Qin | ..................... G06F 16/2453 |
| 2018/0048541 | A1 * | 2/2018 | Reilly | ..................... G06F 16/45 |
| 2018/0300363 | A1 | 10/2018 | Ertl | |
| 2021/0319006 | A1 * | 10/2021 | Ertl | ..................... G06F 16/2255 |
| 2021/0357403 | A1 * | 11/2021 | Dash | ................. G06F 16/24568 |

(Continued)

OTHER PUBLICATIONS

URL: https://en.wikipedia.org/wiki/Stochastic) streaming algorithms (https://en.wikipedia.org/wiki/Streaming_algorithm. Retrieved Feb. 19, 2024.

(Continued)

*Primary Examiner* — Son T Hoang
(74) *Attorney, Agent, or Firm* — Harness, Dickey & Pierce, P.L.C.

(57) ABSTRACT

Methods and technologies are disclosed for the sketch efficient estimation of large-scale multi-sets in distributed, stream-oriented environments. Sketch updates are idempotent and commutative, to support duplicate set elements and varying element sequences. They are also mergeable to support distributed sketch recording. The recording process uses stepwise approximated geometric distributions, efficiently generated from NLZ values of received sketch updates, by using only multiplications with powers of two and integer additions. Sketch registers are subdivided into a portion storing an observed max update value for the register, and a portion storing set of flag bits indicating observed next smaller update values for the register. A Max Likelihood base sketch data evaluation, based on the assumption of statistically independent sketch registers is proposed. The limited number of different probabilities created by the stepwise approximated geometric distributions leads to a Max Likelihood function with coefficients that can be calculated solely with integer arithmetic.

21 Claims, 6 Drawing Sheets

Exemplary Application in the APM/Observability Area

(56) References Cited

U.S. PATENT DOCUMENTS

| | | | |
|---|---|---|---|
| 2022/0188311 A1* | 6/2022 | Tabb | G06F 16/2228 |
| 2023/0120709 A1* | 4/2023 | Sheppard | G06F 16/24545 |
| | | | 707/688 |
| 2023/0153454 A1* | 5/2023 | Lee | G06F 16/24 |
| 2023/0205660 A1 | 6/2023 | Ertl | |

OTHER PUBLICATIONS

URL: https://datasketches.apache.org/docs/DistinctCountFeaturesMatrix.
html#:~:text=Frequent%20Distinct%20Sketches%20%E2%80%
A2Frequent%20Distinct%20Tuples%20Sketch;%20Quantiles%
20And. Retrieved Feb. 19, 2024.
Noga Alon, et al., "The Space Complexity of Approximating the
Frequency Moments*" Journal of Computer and System Sciences
58, 137-147 (1999).
Daniel N. Baker et al., "Dashing: fast and accurate genomic
distances with HyperLogLog." Baker and Langmead Genome Biol-
ogy 20-265, (2019).
Ran Ben Basat et al., "Network-Wide Routing-Oblivious Heavy
Hitters." ANCS '18, Jul. 23-24, 2018, Ithaca, NY, USA.
Paolo Boldi et al., "HyperANF: Approximating the Neighbourhood
Function of Very Large Graphs on a Budget." Jan. 27, 2011.
F. P. Breitwieser et al., "KrakenUniq: confident and fast metagenom-
ics classification using unique k-mer counts." Genome Biology
(2018). URL: https://doi.org/10.1186/s13059-018-1568-0.
Yousra Chabchoub et al., "How can sliding HyperLogLog and
EWMA detect port scan attacks in IP traffic?" EURASIP Journal on
Information Security 2014.
Aiyou Chen et al., "Distinct Counting with a Self-Learning Bitmap."
Bell Laboratories and Rutgers University. Oct. 22, 2018.
Edith Cohen, "All-Distances Sketches, Revisited: HIP Estimators
for Massive Graphs Analysis." Jan. 17, 2015.
Y. Collet et al., "Zstandard Compression and the 'application/zstd'
Media Type." Internet Engineering Task Force (IETF). Feb. 2021.
"Marianne Durand, ""Combinatoire analytique et al.gorithmique
des ensembles de données."" HAL Open Science. Jul. 21, 2010.
URL: https://pastel.hal.science/pastel-00000810."
"R.A. Leo Elworth et al., ""To Petabytes and beyond: recent
advances in probabilistic and signal processing algorithms and their
application to metagenomics."" Nucleic Acids Research, 2020, vol.
48, No. 10 5217-5234. Published Apr. 27, 2020."
"Otmar Ertl, ""New cardinality estimation algorithms for HyperLogLog
sketches."" Feb. 27, 2017."
"Otmar Ertl, ""UltraLogLog: A Practical and More Space-Efficient
Alternative to HyperLogLog for Approximate Distinct Counting.""
Dynatrace Research. Jun. 9, 2024."
"Philippe Flajolet et al., ""HyperLogLog: the analysis of a near-
optimal cardinality estimation algorithm."" Conference on Analysis
of Algorithms, 137-156. 2007."
"Philippe Flajolet et al., ""Probabilistic Counting Algorithms for
Data Base Applications."" Journal of Computer and System Sci-
ences 31, 182-209 (1985)."

"Michael Freitag et al., ""Every Row Counts: Combining Sketches
and Sampling for Accurate Group-By Result Estimates."" Technische
Universität München. 2019."
"Stefan Heule et al., ""HyperLogLog in Practice: Algorithmic
Engineering of a State of the Art Cardinality Estimation
Algorithm."" Mar. 2013."
Matti Karppa et al., "HyperLogLogLog: Cardinality Estimation
With One Log More." May 23, 2022.
"Kevin J. Lang, ""Back to the Future: an Even More Nearly
Optimal Cardinality Estimation Algorithm."" Aug. 22, 2017."
Guillaume Marçais, et al. "Sketching and Sublinear Data Structures
in Genomics." Annual Review of Biomedical Data Science, 2019.
Tal Ohayon, "ExtendedHyperLogLog: Analysis of a new Cardinal-
ity Estimator." Jun. 17, 2021.
"Christina Pavlopoulou et al., ""Revisiting Runtime Dynamic Opti-
mization for Join Queries in Big Data Management Systems.""
Published Oct. 5, 2020."
Seth Pettie et al., URL: https://doi.org/10.1145/3406325.3451032.
Published Jun. 15, 2024.
"Seth Pettie et al., ""Information Theoretic Limits of Cardinality
Estimation: Fisher Meets Shannon?."" 2021."
Seth Pettie et al., "Non-Mergeable Sketching for Cardinality Esti-
mation", 2021 https://drops.dagstuhl.de/entities/document/10.4230/
LIPIcs.ICALP.2021.104.
"B. Priest, R. Pearce, G. Sanders, ""Estimating Edge-Local Triangle
Count Heavy Hitters in Edge-Linear Time and Almost-Vertex-
Linear Space."" IEEE High Performance Extreme Computing Con-
ference (HPEC). Sep. 10, 2018."
Jason Qin et al., "LogLog-Beta and More: A New Algorithm for
Cardinality Estimation Based on LogLog Counting." 2016.
"Björn Scheuermann et al., ""Near-Optimal Compression of Proba-
bilistic Counting Sketches for Networking Applications."" 2007."
"Robert Sedgewick, ""HyperBit a Memory-Efficient Alternative to
HyperLogLog."" Presented on Nov. 13, 2022. URL: https://www.
birs.ca/events/2022/5-day-workshops/22w5004."
Daniel Ting, "Streamed Approximate Counting of Distinct Ele-
ments." Aug. 14, 2014.
Daniel Ting, "Approximate Distinct Counts for Billions of Datasets."
International Conference on Management of Data. 2019.
R. Urban. [n.d.]. SMhasher: Hash function quality and speed tests.
Retrieved Feb. 19, 2024. URL: https://github.com/rurban/smhasher.
A. Vaneev. [n.d.]. Komihash. Retrieved Feb. 19, 2024. URL:
https://github.com/avaneev/komihash.
"Dingyu Wang et al., ""Better Cardinality Estimators for HyperLogLog,
PCSA, and Beyond."" 2022."
Jake Wires et al., "Characterizing Storage Workloads with Counter
Stacks." "2014. URL: https://www.usenix.org/conference/osdi14/
technical-sessions/presentation/wires".
"Qingjun Xiao et al., ""Estimating Cardinality for Arbitrarily Large
Data Stream With Improved Memory Efficiency."" IEEE/ACM
Transactions on Networking, vol. 28, No. 2, Apr. 2020."
Yunxiang Zhao et al., "Hermes: An Optimization of HyperLogLog
Counting in real-time data processing." Conference: 2016 Interna-
tional Joint Conference on Neural Networks (IJCNN). Jul. 2016.

* cited by examiner

FIG. 1: Exemplary Stepwise Approximated
Geometric Distributions
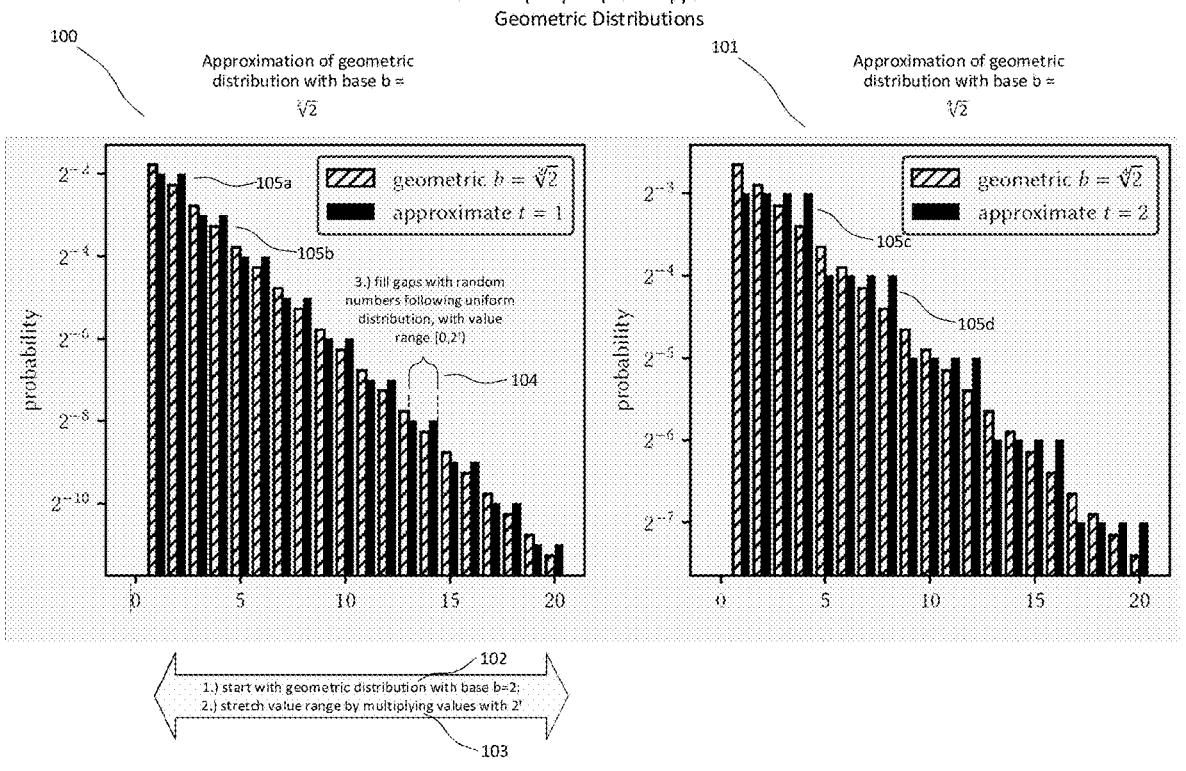

Figure 2:
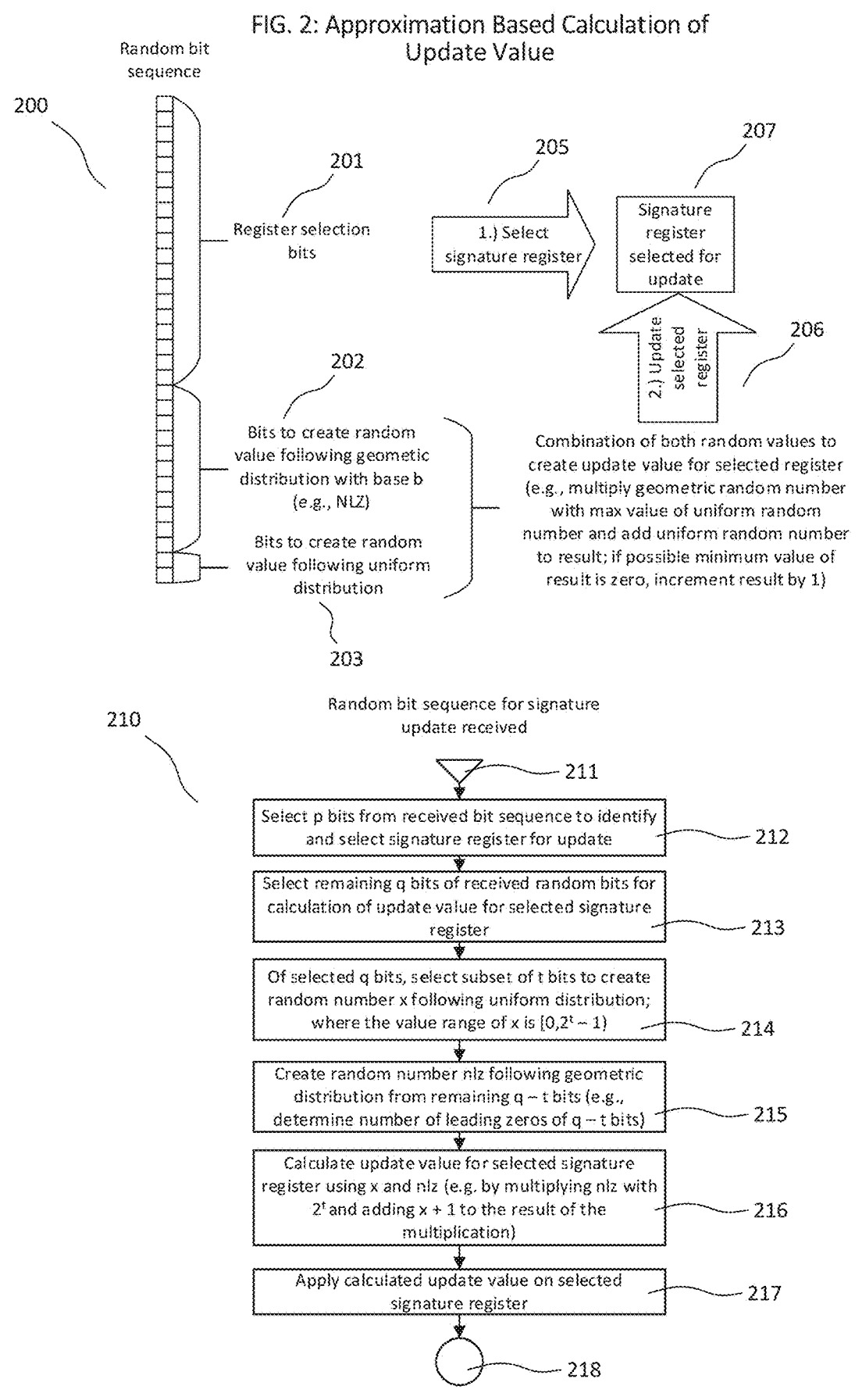

FIG. 2: Approximation Based Calculation of Update Value

Random bit sequence

200

201

Register selection bits

202

Bits to create random value following geometic distribution with base b (e.g., NLZ)

Bits to create random value following uniform distribution

203

205

1.) Select signature register

207

Signature register selected for update

206

2.) Update selected register

Combination of both random values to create update value for selected register (e.g., multiply geometric random number with max value of uniform random number and add uniform random number to result; if possible minimum value of result is zero, increment result by 1)

Random bit sequence for signature update received

210

211

Select p bits from received bit sequence to identify and select signature register for update — 212

Select remaining q bits of received random bits for calculation of update value for selected signature register — 213

Of selected q bits, select subset of t bits to create random number x following uniform distribution; where the value range of x is $[0, 2^t - 1]$ — 214

Create random number nlz following geometric distribution from remaining q – t bits (e.g., determine number of leading zeros of q – t bits) — 215

Calculate update value for selected signature register using x and nlz (e.g. by multiplying nlz with $2^t$ and adding x + 1 to the result of the multiplication) — 216

Apply calculated update value on selected signature register — 217

218

FIG. 3: Register Update
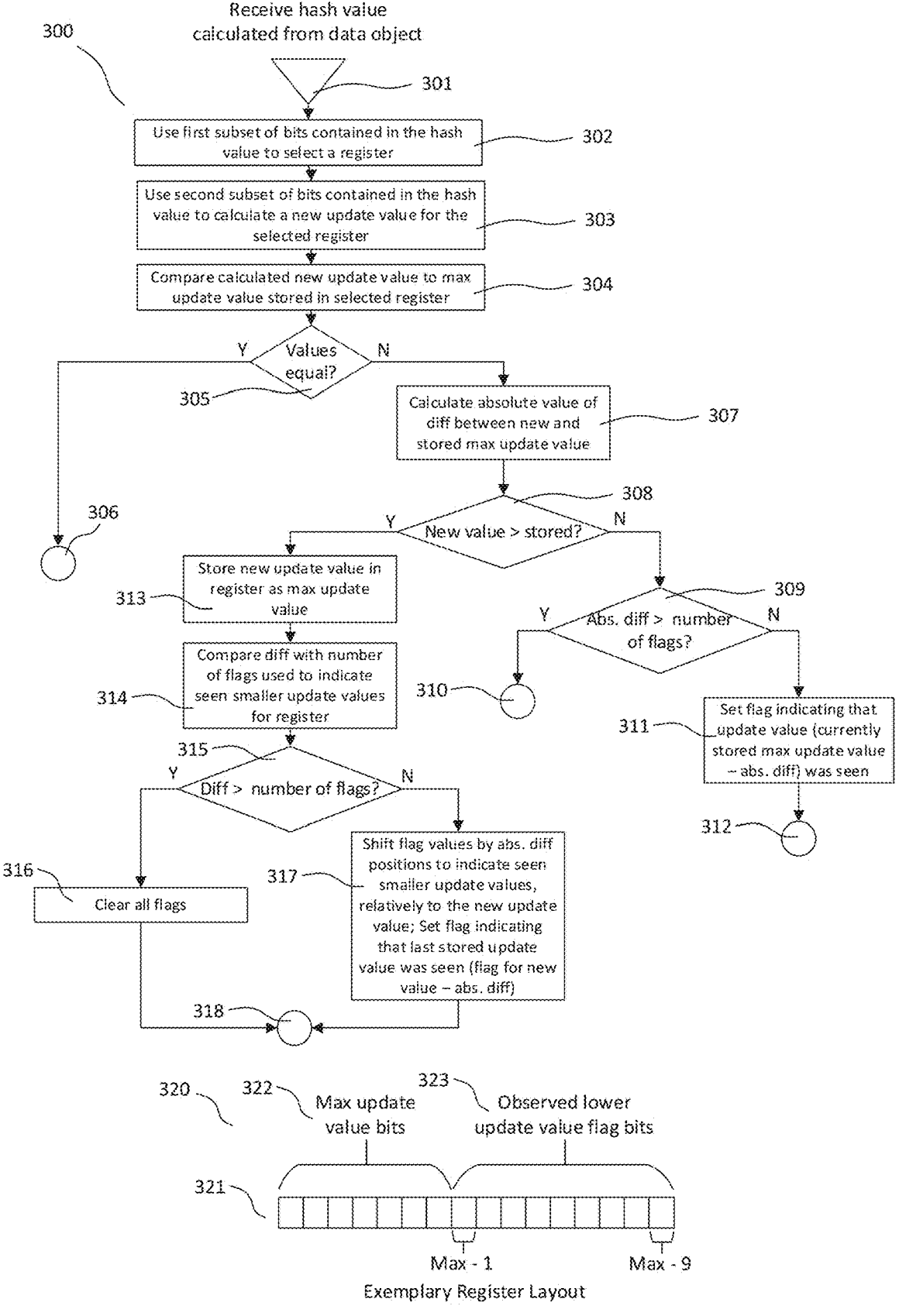
Exemplary Register Layout

FIG. 4: Evaluation of Recorded Sketch using
Maximum Likelihood Method

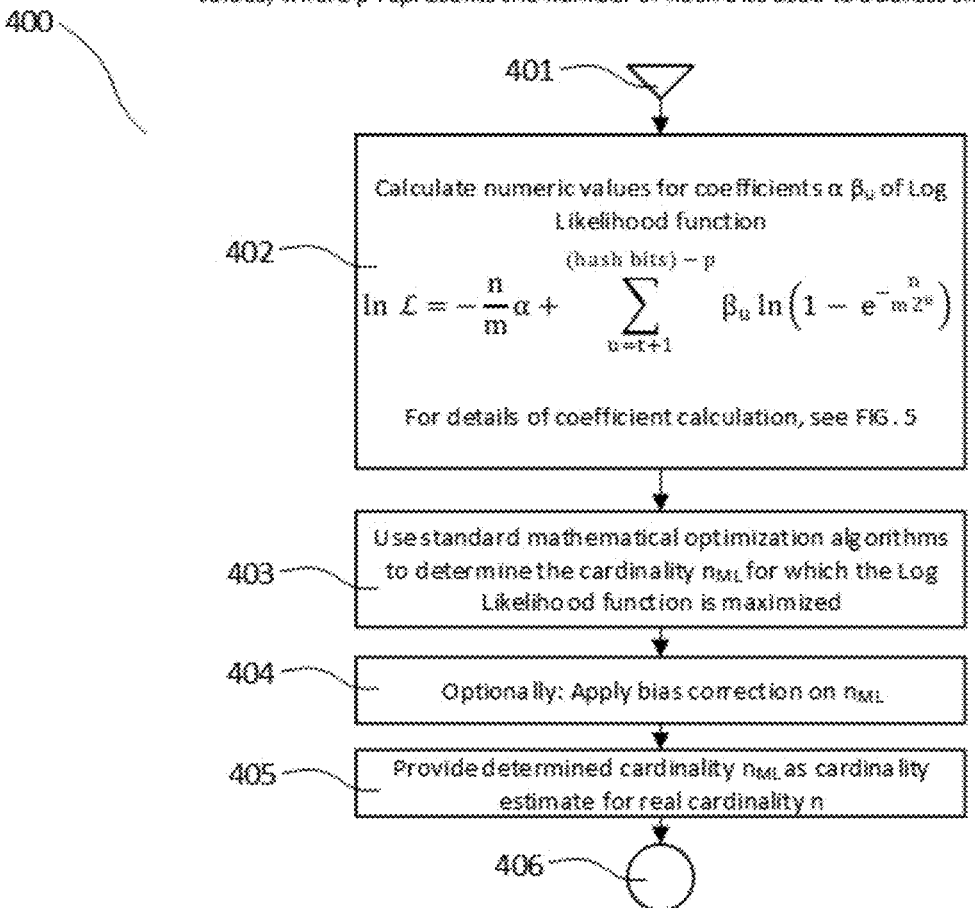

Received sketch record containing m registers, where hash bits denotes the number of random bits that were used to address sketch registers and to determine register update values, where p represents the number of hash bits used to address sketch registers

400

401

402

Calculate numeric values for coefficients α β$_u$ of Log Likelihood function $$\ln \mathcal{L} = -\frac{n}{m}\alpha + \sum_{u=r+1}^{(\text{hash bits}) - p} \beta_u \ln\left(1 - e^{-\frac{n}{m\,2^u}}\right)$$

For details of coefficient calculation, see FIG. 5

403

Use standard mathematical optimization algorithms to determine the cardinality n$_{ML}$ for which the Log Likelihood function is maximized

404

Optionally: Apply bias correction on n$_{ML}$

405

Provide determined cardinality n$_{ML}$ as cardinality estimate for real cardinality n

406

FIG. 5: Calculation of Numeric Values of Log Likelihood Coefficients α and $\beta_u$

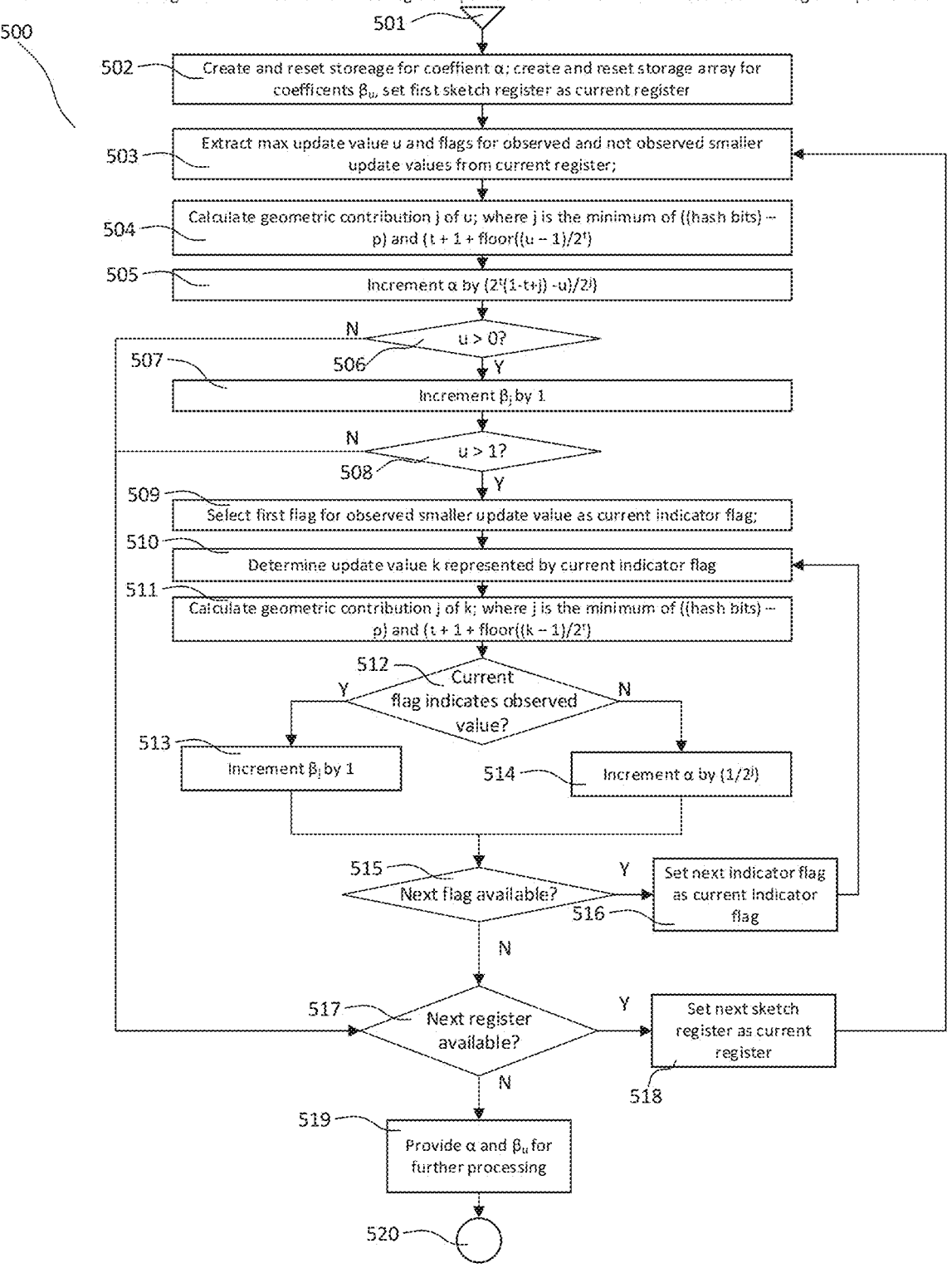

Receive register set of a recorded sketch record containing m registers, and recording parameters, including number of random hash bits used as input for recording, p as number of bits used to address sketch registers, q as number of bits used to calculate register update values and t as number of bits taken from the q bits to determine a uniformly distributed random number, and d as the number of flag bits used to store observed register update values smaller that the recorded max register update value

500

501

502 — Create and reset storeage for coeffient α; create and reset storage array for coefficents $\beta_u$, set first sketch register as current register

503 — Extract max update value u and flags for observed and not observed smaller update values from current register;

504 — Calculate geometric contribution j of u; where j is the minimum of ((hash bits) – p) and (t + 1 + floor((u – 1)/2^t))

505 — Increment α by $(2^t(1-t+j) -u)/2^j)$

506 u > 0?   N   507   Y

507 — Increment $\beta_j$ by 1

508 u > 1?   N   Y

509 — Select first flag for observed smaller update value as current indicator flag;

510 — Determine update value k represented by current indicator flag

511 — Calculate geometric contribution j of k; where j is the minimum of ((hash bits) – p) and (t + 1 + floor((k – 1)/2^t))

512 — Current flag indicates observed value?   Y   N

513 — Increment $\beta_j$ by 1     514 — Increment α by $(1/2^j)$

515 — Next flag available?   Y   516 — Set next indicator flag as current indicator flag

N

517 — Next register available?   Y   518 — Set next sketch register as current register

N

519 — Provide α and $\beta_u$ for further processing

520

FIG. 6: Exemplary Application in the APM/Observability Area
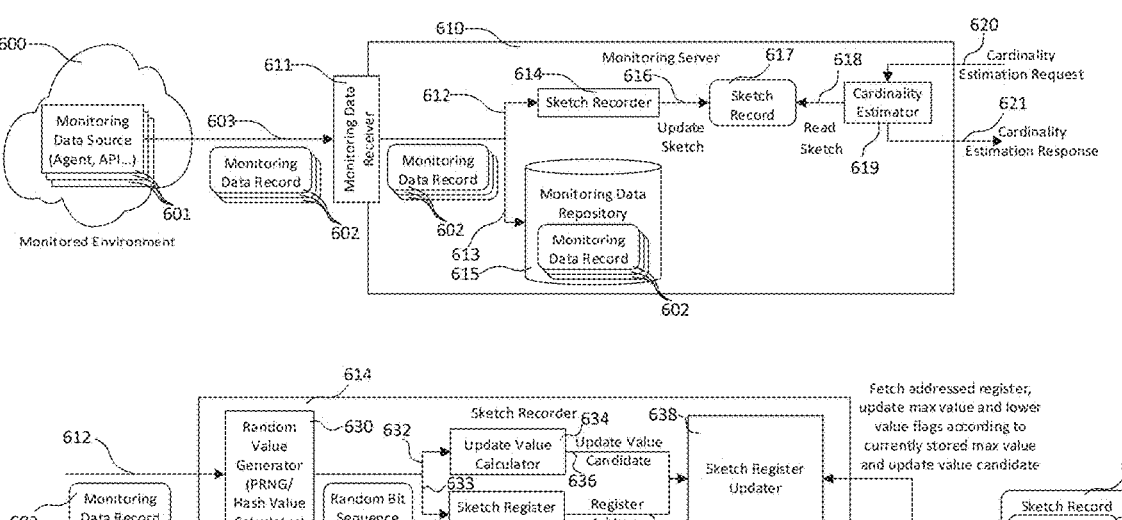
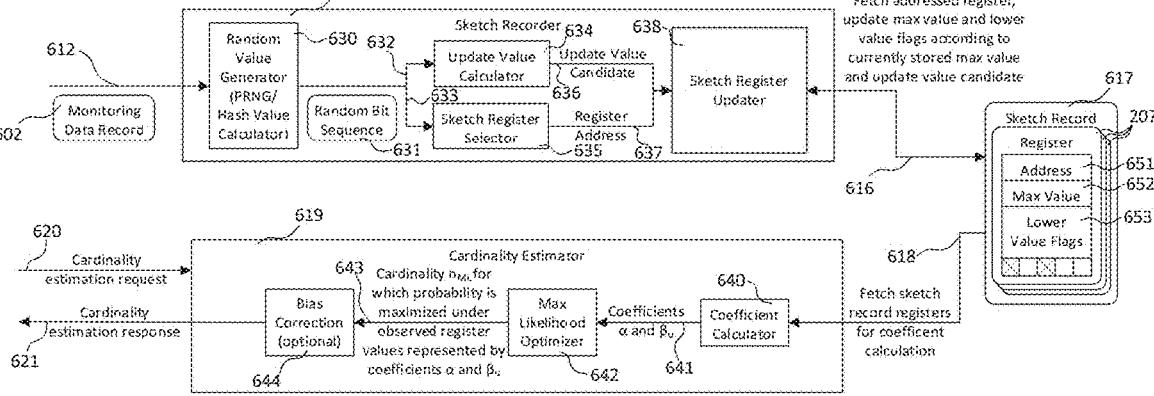

SPACE EFFICIENT TECHNIQUE FOR ESTIMATING CARDINALITY USING PROBABILISTIC DATA STRUCTURE

CROSS-REFERENCE TO RELATED APPLICATIONS

This application claims the benefit and priority of U.S. Provisional Application No. 63/535,355 filed on Aug. 30, 2023 and U.S. Provisional Application No. 63/613,351 filed on Dec. 21, 2023. The entire disclosure of the above applications are incorporated herein by reference.

FIELD

The present disclosure relates to techniques for estimating cardinalities of multi sets using a probabilistic data structure. More specifically, it relates to a commutative, idempotent, and mergeable probabilistic sketch data structure capable for estimation of different elements occurring in distributed data streams, and an efficient, Max Likelihood based cardinality estimation method requiring only basic, non-floating point arithmetic and bit shift operations for the evaluation of recorded sketch data.

BACKGROUND

Estimating the number of different elements in data sets or streams is a frequently required task in numerous modern applications. Examples include to estimate the number of recurring users accessing an application, the number of different devices used for the access, and the like, or more generically, the number of different events that occurred or were observed.

Typically, such events are recorded in a distributed manner, events of the same type may occur multiple times and in different sequences. Therefore, estimation methods are required that create mergeable probabilistic data structures (i.e., data structures created from two subsets may be combined to create a data structure representing both subsets). Further, those estimation methods need to be idempotent (multiple occurrences of the same element do not change the estimation result) and commutative (the sequence of the elements has no influence on the estimation result).

Various estimation approaches are known in the art, the most prominent being the HyperLogLog method, and its variants, which provide all those features, and which also support a relatively large estimation range with rather small and constant memory footprint.

However, ever increasing traffic that is handled by modern applications also increases the demand for the supported estimation range of estimation methods, until a level is recached where a support using HyperLogLog or other known estimation methods is no longer economical due to their memory footprint.

Consequently, there is demand in the field for a set cardinality estimation method, which is mergeable, idempotent, and commutative, and that is more memory efficient than known approaches, like HyperLogLog.

This section provides background information related to the present disclosure which is not necessarily prior art.

SUMMARY

This section provides a general summary of the disclosure, and is not a comprehensive disclosure of its full scope or all of its features.

The objective of the disclosed technologies and method is a probabilistic estimation method for the cardinality of large-scale multi-sets that has a better memory efficiency as known approaches, in terms of count information stored per memory unit of recorded sketch data, while retaining valuable features of known approaches, like idempotency, commutativity or mergeability of recorded sketch data.

Probabilistic estimation methods are typically subdivided into a recording phase, where data records are received and used to update a sketch data record, and an evaluation phase, in which the recorded sketch data record is evaluated to gain an estimation value representing the recorded data records, like the number of distinct data records (or set cardinality) of the set of received data records.

One aspect of the disclosed technologies is directed to the improvement of the recording process by storing sketch data derived from multiple received data records in one sketch register. Conventional approaches derive update values, like hash values from received registers, and always store only one of those values in a sketch register. As an example, the highest observed update value may be stored. The proposed new approach divides sketch registers into two sections, a first section to store the highest observed update value for the sketch register, and a "next lower value" flag section, containing a flag bit for next lower observed sketch update values. With this approach information about n+1 observed update values, where n is the number of bits in the "next lower value" flag section can be stored in a single register.

Another aspect of the disclosed technologies is directed to the adaptation of the statistical process to gain sketch update values fro m processed data records to achieve better memory utilization. Conventional approaches typically generate hash values from received data records, determine the number of leading zeros (NLZ) of the hash values and use the NLZ values as register update values. The NLZ follows a geometric distribution, which is required by most probabilistic estimation methods. As determining the NLZ of a value is a very fast operation, which requires only one CPU operation on some computing systems, this is an ideal method to determine sketch update values.

The NLZ follows a geometric distribution with a success probability/base of $\frac{1}{2}$ (the factor between the probability of two adjacent values of the distribution is 2). Experiments and theoretical analyses showed that using a geometric distribution with this success probability yields information densities that are far below a theoretical maximum.

Geometric distributions with other success probabilities, in the value range between $\frac{1}{2}$ and 1, like e.g.

$$1/\sqrt[2]{2} \ \text{ or } \ 1/\sqrt[4]{2}$$

would yield better information densities, but calculating random values that exactly follow such geometric distributions is computationally much more expensive than determining the NLZ of a hash value.

To overcome this problem, stepwise approximate geometric distributions, which approximate geometric distributions with desired success probabilities may be derived from NLZ values. The approximation may start with an NLZ value generated from a subset of received random bits, multiply the NLZ value with a factor $2^n$, select n bits from another subset of the received random bits and then add the n bits to the result of the multiplication. The result of this operation is a stepwise geometric distribution, for which the success probability factor is $\frac{1}{2}$ between consecutive steps, where the probability of values within a step is equal. For a step width of 2, this approximates a geometric distribution with success probability $$1/\sqrt[2]{2}$$

and for step width 4 a geometric distribution with success probability $$1/\sqrt[4]{2}.$$

The so created approximation geometric distributions are sufficiently exact for the cardinality estimation use case, and the creation of random values that follow such approximation geometric distributions is nearly as efficient as the creation of NLZ values.

Another aspect is directed to the evaluation of sketch data structures that were recorded as described above, using a Max Likelihood approach, which iteratively determines the most likely cardinality for a set, given the recorded observations of the set, in form of the sketch data structure.

The evaluation method assumes statistic independence between different registers of the sketch. Using this assumption, a Max Likelihood function can be established which only requires two types of coefficients, $\alpha$ and $\beta$. The values of those coefficients only depend on the values of the sketch register.

The above-described approximation method for geometric distributions with a success probability other than $\frac{1}{2}$ yields only probabilities that are a multiple of $\frac{1}{2}^a$, where a represents the number of bits of received random bit sequences that are used for the creation of sketch update values. This limited number of possible probability values leads to a computation method of the coefficients $\alpha$ and $\beta$ that only requires efficient and fast integer arithmetic.

Further areas of applicability will become apparent from the description provided herein. The description and specific examples in this summary are intended for purposes of illustration only and are not intended to limit the scope of the present disclosure.

DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 1 shows two visualizations of stepwise approximated geometric distribution, one with step width $2^1$ and one with step width $2^2$.

FIG. 2 provides a data flow diagram and a flow chart describing the calculation of random values that follow a stepwise approximated distribution using the NLZ value of a portion of a random bit sequence.

FIG. 3 shows a flow diagram of the register update process that updates the max update value, and flags for observed next smaller update values, and a register layout to store max update values and smaller update value flags.

FIG. 4 provides a flow chart of the evaluation of a recorded sketch register to calculate a cardinality estimation of an observed set, using a Max Likelihood approach.

FIG. 5 contains a flow chart describing the calculation of coefficients $\alpha$ and $\beta$ of the Max Likelihood function.

FIG. 6 provides a block diagram showing an exemplary application of the estimation method in the application performance monitoring and observability space.

DETAILED DESCRIPTION

Example embodiments will now be described more fully with reference to the accompanying drawing.

The features of the disclosed cardinality estimation method include fast sketch update during recording, idempotency, mergeability and commutative insert operations, combined with a memory efficiency that up to 24% better than known cardinality estimation sketches with similar features. This combination of features and improved memory efficiency qualify the proposed estimation function for various tasks. One example task is the estimation of the number of distinct users of a monitored web application. Agents may be deployed to web browsers that are used to interact with the web application and the agents may provide monitoring data describing those usages, where this monitoring data may contain identification data for individual browsers that are used to perform the interaction. This monitoring data may be forwarded by the agents to intermediate nodes, which may use local sketching data structures of the proposed type to record reported browser instances. Those local sketching data structures may, after a certain period of time, be forwarded to one or more central monitoring server units, where they may be merged and analyzed to calculate an estimate for the number of distinct web browsers that were used to interact with the monitored web application. As one web browser is typically operated by exactly one user, this is also a valid estimate for the number of distinct users interacting with the monitored application.

Another example application of the proposed sketching data structure is the optimization of database query executions that include join operations of multiple tables. To select optimal join sequences, fast and accurate estimations of the number of distinct values contained in table columns are required. The improved memory efficiency of the proposed cardinality estimation sketch enables optimization algorithms to keep a higher number of sketching data structures in main memory simultaneously, which can considerably improve speed and performance of those optimization algorithms.

Known sketching data structures, like HyperLogLog and variants, use random values that follow a geometric distribution to record observed set elements. To efficiently generate such a geometrically distributed random value, known approaches start with a uniformly distributed random value, like a set of bits taken from a hash value calculated from a received data element, and then count the number of leading zeros (NLZ) of the selected bits. The so generated random values follow a geometric distribution where the probability of getting a specific value x is double the probability of receiving x+1. More specifically, the probability of getting 0 leading zero bits is double the probability of getting 1 leading zero and so on. The probability mass function (PMF) of such a geometrically distributed random value may be described as shown in equation [1], where k denotes generated random values and b describes the constant factor with which the probability of generating a value of k+1 decreased from the probability of generating a value of k. For NLZ based geometric distributions b has the value of 2. Parameter b may also be denoted herein as the "base" of a geometric distribution.

$$\rho_{update}(k) = (b-1)b^{-k} k \geq 1, b > 1 \qquad [1]$$

Research work conducted by the inventor hinted that using geometric distributions having a parameter b below the value 2, especially in the value range between 1.8 and 1.1 yield higher storage efficiencies for recorded sketch data. Storage efficiency may be calculated in form of a memory-variance product (MVP), which is basically calculated by multiplying the variance (lower values are better) of an estimation result based on a sketch data record that was recorded using a specific recording configuration with the amount of memory used to store the sketch. The MVP enables to compare different sketching approaches by configuring them to use the same amount of memory for sketch data storage, calculate respective MVPs, and rank them by increasing MVP value, as lower MVPs indicate more efficient memory usage.

However, using a geometric distribution for recording sketch data that is optimized for memory efficiency severely decreases the performance of the recording process. To create geometrically distributed random values with base equal to 2, it is sufficient to determine the number of leading zeros from a given binary random number, which can be performed highly efficient by most current computing systems. Creating geometric distributions with a different base requires disproportionately higher computing resources, as this typically requires the usage of a random number generator which is configured to create geometrically distributed values out of provided uniquely distributed ones. As sketch updates are typically performed frequently and in large amounts, such increased calculation effort disqualifies the usage of exact geometric distributions with an arbitrary base.

To overcome this problem, random values that follow an approximation of a geometric distribution with a base different to 2 may be used. A stepwise geometric distribution may be created, where a highly efficient process, like determining NLZ of a given, uniformly distributed binary random number, is used to create a random number that follows a geometric distribution with base 2.

This random number may then be multiplied with a power of two ($2^1$, $2^2$, . . . ), which "stretches" the value range of the random number. Then a uniformly distributed random number in the range from 0 to the selected power of two (0-1 for $2^1$, 0-3 for $2^2$, . . . ) may be added to the result of the multiplication. As an example, bits from the received uniformly distributed random number that are not used to determine the NLZ value may be used to form this uniformly distributed random number. The result is a stepwise geometrically distributed random variable, where values of a given probability step or level are uniformly distributed. FIG. 1 shows two examples of such approximated geometric distributions, one for an approximation of a geometric distribution with a base of $$\sqrt[2]{2} \ 100,$$

and one with a base of $$\sqrt[4]{2} \ 101.$$

The computational effort to create random numbers that follow such an approximated geometric distribution is similar to the effort of creating random numbers following an exact geometric distribution with base 2. In both cases, NLZ of a uniformly distributed binary random number needs to be determined. For the approximation, only a multiplication with a power of two, which may be implemented with a simple and highly efficient bit shift and an integer addition are required additionally. The PMF of this stepwise geometric distribution is given by equation [2], where t denotes the number of bits used for creating the uniformly distributed random number.

$$\rho_{update}(k) = \frac{1}{2^{t+1+\lfloor (k-1)/2^t \rfloor}} \ k \geq 1, t \geq 0 \qquad [2]$$

FIG. 1 visualizes the steps that are performed to create a random number that follows such a stepwise approximated geometric distribution. First, 102, a random number following a geometric distribution with base 2 is created, e.g., by determining NLZ of a received uniformly distributed random number. Then, the created random number is multiplied by $2^t$, e.g., using bit shift operations. In a third step 104, a uniformly distributed random number in the range from 0 to $2^t$ is added to the result of the multiplication. To generate this uniformly distributed random number, t bits of the received uniformly distributed random number may be selected and interpreted as the required random number.

The outcome of those steps are approximations for geometric distributions with a base of $$2^t\sqrt{2},$$

where the probabilities of values change in steps, e.g., 105a, 105b, 105c and 105d, and where the width of a step having the same probability is $2^t$. The approximated distribution shown in chart 100 uses t=1 and approximates a geometric distribution with base $$\sqrt[2]{2},$$

and the one in chart 101 uses t=2 and approximates a geometric distribution with base $$2^2\sqrt{2}.$$

Coming now to FIG. 2, which describes the creation of random update value following a stepwise geometric distribution in more detail.

The upper part of FIG. 2 describes an exemplary usage of a randomly created bit sequence 200 for the selection 205 of a sketch or signature register 207, and the creation of an update value candidate for the potential update 206 of the selected register. A first portion 201 of the random bit sequence may be used to select specific register, and a second portion may be used to generate the update value candidate for the selected register, where this second portion is subdivided into a sub portion 202 used for creating a geometrically distributed random value, and a second sub portion 203 is used for creating a uniformly distributed random value. The update value for the selected register may then be calculated according to equation [3], where NLZ represents the number of leading zeros of the bits of sub portion 202 used to create the geometrically distributed random value and t is the number of bits of sub portion 203 used for creating the uniformly distributed random value.

$$\text{update value} = NLZ * 2^t + (\text{value of the } t \text{ bits}) + 1 \qquad [3]$$

Equation [3] represents an ideal stepwise approximated geometric distribution, for which an infinite number of steps is assumed. In the technical application, the number of bits used to generate update values and to store them are limited. This leads to adapted equation [4], which distinguishes between steps of the stepwise approximated geometric distribution for which a next greater step can be generated/ stored, and the maximum creatable/storable step of the approximated distribution.

As it is not possible to create/store a distribution step that exceed the maximum possible step of the distribution, the probability to receive update from this step subsumes the probability to receive an update value from the maximum possible step and the probabilities to receive an update value from all (impossible to create/store) distribution steps that exceed the maximum creatable/storable step.

$$\rho_{update}(k) = \qquad\qquad\qquad\qquad\qquad\qquad\qquad [4]$$

$$\begin{cases} \dfrac{1}{2^{t+1+\lfloor (k-1)/2^t \rfloor}} & 1 \le k \le ((\text{hash bits}) - p - t)\,2^t \\ \dfrac{1}{2^{(\text{hash bits})-p}} & ((\text{hash bits}) - p - t)\,2^t < k \le ((\text{hash bits}) + 1 - p - t)\,2^t \\ 0 & \text{else} \end{cases}$$

In equation [4], "hash bits" denotes the number of hash bits of the received random value that is used for the creation of the update value, p denotes the number of bits used to address a sketch register and t the number of bits used to create a uniformly distributed random value. The remaining bits of the random value ("hash bits"–p–t) are used for the creation of a geometrically distributed random value. The first case of equation [4] represents the probability to receive update values from distribution steps below the maximum distribution step and the second case represents the probability of receiving update values form the maximum possible distribution step.

Various layouts of the random bit sequence may be used for register selection and creation of the register update value, including layouts where the bits used for sketch register selection are located after bits used to create the geometrically distributed random value and before the bits used to create the uniformly distributed random value. Such layouts are advantageous for the downsizing already recorded sketches.

The lower section of FIG. 2 contains flow chart 210, which describes the process of selecting a sketch/signature register and calculating an update value for the selected register on receipt of a random bit sequence generated from a received data record.

The process starts with step 211, when a (pseudo) random bit sequence for the update of the signature sketch is received. As an example, the bit sequence may be generated by applying a hash function on a received a data record or by using the received data record to seed a pseudo random number generator and then generate a random bit sequence using the pseudo random number generator. Following step 212 may then select p bits from the received random bit sequence and use those p bits as address of a register of the signature sketch data structure. Subsequent step 213 may then select the remaining q bits of the received random bit sequence for the calculation of a candidate update value for the register addressed by the p bits.

Following step 214 may then select t bits from the q previously selected bits for the creation of a random number x from the range $[0, 2^t-1]$ that follows a uniform distribution. As the t bits are selected form the received random bit sequence, they already represent a random number following a uniform distribution.

Then, step 215 is executed, which selects the remaining q-t bits of the received random bit sequence to derive a random number that follows a geometric distribution with base 2 form the selected bits. Step 215 may determine the number of leading zeros (NLZ) of the selected bit sequence, as this represents a random number following a geometric distribution with base 2.

Subsequent step 216 may then calculate an update value candidate for the sketch register selected in step 214 by multiplying the NLZ value determined in step 215 by $2^t$, incrementing the random number calculated in step 214 by 1 and then adding the result of the increment to the result of the multiplication to calculate the update value candidate.

Following step 217 then applies the calculated candidate update value to the selected signature sketch register. A detailed description of this process, which may include updating a value for a max update value for the register, and updating flags contained in the register representing next smaller observed update values, is shown in FIG. 3.

The process then ends with step 218.

Recording of sketch data using a stepwise approximated geometric distribution to generated register update values may be combined with the recording of a subset of observed register update values that are smaller than the currently known maximum update value for a given sketch register.

A recording process that uses d sketch register bits to record if update values that are 1 to d smaller than the currently stored max update value where also observed for a given register is shown in the upper section of FIG. 3, and a conceptual layout of a sketch register capable to store a max update value and d flag bits to store indicators for observed smaller update values is shown in the lower section of FIG. 3.

The process 300 of evaluating a candidate update value for a sketch register starts with step 301, when random bit sequence for the update of the signature sketch is received. Subsequent step 302 then uses a first subset of p bits of the received bit sequence to address and select a specific register of the signature sketch and following step 303 uses the remaining bits of the received random bit sequence to calculate an update value candidate for the selected register. Calculation of the update value candidate may be performed as described in steps 213 to 216 of process 210. Following step 304 compares the calculated candidate update value with the max update value currently stored in the selected register, and decision step 305 terminates the process if candidate update value and currently stored max update value are equal. Otherwise, step 307 is executed, which calculates the absolute value of the difference between stored max value and update value candidate.

Subsequent decision step 308 then determines whether the candidate update value is greater than the stored max value.

In case the update value candidate is greater than the currently stored max update value, the process continues with step 313, which stores the candidate update value in the selected register as new max update value.

Following step 314 then compares the difference between original max update value and candidate update value that was determined in step 307 with the number of flag bits of the register to indicate observed smaller update values for the register. If the difference exceeds the number of flag bits, decision step 315 continues the process with step 316, which clears all flags indicating observed update values that are smaller than the currently stored max update values. In this case, the difference between last and current max update value is greater than the value range covered by those flag bits, therefore all flag bits are cleared. As an example, three flag bits may be available, representing observed update values 1, 2 or 3 smaller than the currently stored max update value. If the difference between last stored and current max update value exceeds 3, then all flags are cleared, because no update value in the value range covered by the flag bits was observed yet. The process then ends with step 318.

In case decision step 315 determines that the difference between last and current max update value is not greater than the number of flag bits, the process continues with step 317, which shifts the flag bits to represent seen update values, relative to the new stored max update value, and then sets the flag bit representing the last stored max update value. More specifically, for n flag bits, where bit 0 represents currently stored max value −1 and bit n represents currently max stored value −n, and a difference d between last and currently stored max update value, step 317 may move values of the flag bits down by d, e.g., value of bit 0 is moved to bit d, value of 1 is moved to bit d+1 and so on. This adjusts the flag bits to represent the difference to the new max update value. Bit values that would be moved to a flag bit with an index greater than n are ignored. Then flag bits form 0 to d are cleared, because up to now, no update values in this were observed. Finally, step 317 may set the value of bit d, which represents the last max update value to 1. The process then ends with step 318.

If decision step 308 determines that the candidate update value is not greater than the stored max value, the process continues with step 309, which determines whether the difference determined by step 307 is greater than the number of flag bits stored in the register. If the difference is greater than the number of flag bits, then no update to the register is required and the process terminates with step 310. Otherwise, the process continues with step 311, which sets the flag bit representing the observed update value candidate. For n flags representing update values 1, 2 . . . n smaller than the currently stored max update value, step 311 may set the flag bit having the same index as the difference calculated by step 308. The process then ends with step 312.

Referring now to the lower section of FIG. 3, which visualizes an exemplary layout 320 of a signature sketch register 207. A sequence of bits 321, in this example 16 bits, represent the register. Out of those 16 bits, 7 bits 322 are used to store the current max update value, and the remaining 9 bits are used to store flags for observed smaller update values, where the first of those bits represents an observed update value of current max update value −1 and the last one represents current max update value −9.

After recording is finished, a sketch register stores the value of the max update value that was created for the register, and for update values 1 to d smaller than the stored max update value, a flag indicating whether the corresponding update value was created for the register.

Sketch data structures recorded as described above may be evaluated in various ways to calculate estimates for the cardinality of the set described by the recorded sketch data.

One exemplary estimation variant is based on the Max Likelihood method. This approach uses a statistical model that describes the dependency of the probability to observe observed register value configurations on the cardinality of recorded set. For a given register value configuration, the parameterization of this model is optimized to determine the cardinality for which the probability of receiving the given register value configuration is maximized.

A first step of creating the statistical model is to assume that the cardinality of the set is itself not fixed, but follows a Poisson process, where the mean of the Poisson process equals to the sought for cardinality. With this assumption, also the number of register updates is not fixed, which leads to a statistical model where the probabilities of updates to registers and observed register values are statistically independent. As a consequence, probabilities for the whole register set of a recorded sketch can be calculated by simply multiplying the probabilities of the individual registers of the sketch. This leads to a Log Likelihood function as described in equation [5], where n represents the sought cardinality, $r_0$ to $r_{m-1}$ represent individual register values, m the number of registers of the sketch, and $\rho_{reg}(r_i|n)$ represents the probability of observing the value of register $r_i$ under the cardinality given by n.

$$\ln \mathcal{L} = \ln \mathcal{L}(n|r_0, ..., r_{m-1}) = \sum_{i=1}^{m-1} \ln \rho_{reg}(r_i|n) \qquad [5]$$

The probability that a register receives an update value k at least once is given by equation [6].

$$Pr(A_k) = 1 - e^{-\frac{n}{m}\rho_{update}(k)} \qquad [6]$$

A sketch register stores the highest received update value. To describe the probability that an update value is the highest received update value, it is required to model the combined probability that a specific update value for the register was received, and that no other update values that are greater than the specific update value were received for the register. Function f described in equation [7] provides a compact notation for the probability that no update value greater than function parameter u was received for a register.

$$f(u) := \sum_{k=u+1}^{((hash\ bits)-p-t)2^t} \rho_{update}(k) =$$

$$\begin{cases} \dfrac{2^t\left(2+\lfloor(u-1)/2^t\rfloor\right)-u}{2^{t+1+\lfloor(u-1)/2^t\rfloor}}, & 0 \le u \le ((hash\ bits)-p-t)\,2^t \\[2ex] ((hash\ bits)+1- \\ \dfrac{p-t)2^t-u}{2^{(hash\ bits)-p}}, & \begin{array}{l}((hash\ bits)-p-t)\,2^t < u \le \\ ((hash\ bits)+1-p-t)\,2^t\end{array} \end{cases}$$

Applying equations [5] and [6] for all possible register values, where registers store the max received update value, and d flag bits for received update values that were up to d bits smaller than the max received update value, yields equation [8] as probability mass function (PMF) for a single sketch register:

$$\text{Case } 1\, r = 0: \ \rho\left(r|n\right) = e^{-\frac{n}{m}} \qquad [8]$$

Case $2\, r = u2^d + \langle l_1 ... l_{u-1}\rangle_2 \, 2^{d+1-u}$ with $1 \leq u \leq$ and $l_j \in \{0, 1\}$:

$$\rho\left(r|n\right) = \left(1 - e^{-\frac{n}{m}\rho_{update}(u)}\right)e^{-\frac{n}{m}f(u)} *$$

$$\prod_{j=1}^{u-1}\left(e^{-\frac{n}{m}\rho_{update}(u-j)}\right)^{1-l_j}\left(1 - e^{-\frac{n}{m}\rho_{update}(u-j)}\right)^{l_j}$$

Case $3\, r = u2^d + \langle l_1 ... l_d\rangle_2$ with $d +$ $$1 \leq u \leq ((\text{hash bits}) + 1 - p - t)\,2^t \text{ and } l_j \in \{0, 1\}:$$

$$\rho\left(r|n\right) = \left(1 - e^{-\frac{n}{m}\rho_{update}(u)}\right)e^{-\frac{n}{m}f(u)} *$$

$$\prod_{j=1}^{d}\left(e^{-\frac{n}{m}\rho_{update}(u-j)}\right)^{1-l_j}\left(1 - e^{-\frac{n}{m}\rho_{update}(u-j)}\right)^{l_j}$$

$$\text{Otherwise: } \rho\left(r|n\right) = 0$$

Case 1 covers sketch registers that received no update value. Case 2 covers the registers that contain a max update value smaller than or equal to the number d of flag bits used to store observed update values that are smaller than the max update value. In this case, not all flag bits carry information about the recorded set, because for a max update value that is smaller than or equal to d, it is not possible to generate d positive, smaller update values. Case 3 represents the "general" case, where the stored max update value exceeds d, and all d flag bits carry information about the recorded set. In the register PMF [8], terms of the form $$\left(1 - e^{-\frac{n}{m}\rho_{update}(u)}\right)$$

describe the probability that update value u was received for the register, terms of the form $e^{-n/mf(u)}$ describe that no updater value greater than u was received for the register and terms of the form $e^{n/m\rho_{update}(u)}$ describe the probability that an update value u was not received for the register. The notation $\langle l_1 ... l_d\rangle_2$ describes the register flags that are used to store data about observed update values for the register that are smaller than the max update value stored in the register, where $l_1$ has the value 1 if an update value (max update value −1) was observed and 0 otherwise. Same for $l_2$ and an observed update value (max update value −2) and so on.

Applying the register value PMF [8], and the definition of $\rho_{update}$, as specified in equation [4] on the Log Likelihood function defined in equation [5], by taking advantage of $\rho_{update}$ always being a power of two from the set $\{\frac{1}{2}^{(t+1)}, \frac{1}{2}^{(t+2)}, ..., \frac{1}{2}^{(hash\,bits)-p)}\}$, yields the simplified Log Likelihood function of equation [9].

$$\ln \mathcal{L} = -\frac{n}{m}\alpha + \sum_{u=t+1}^{(hash\,bits)-p}\beta_u \ln\left(1 - e^{-\frac{n}{m2^u}}\right). \qquad [9]$$

The coefficients $\alpha$ and $\beta_u$ depend on register values only, and the values of those coefficients may be calculated using only basic and efficient computing instructions, like additions, subtractions, and bit shift operations. The coefficient $\alpha$ relates to update values which were not observed according to the received register status, like update values greater than the stored max update values, or update values for which the flags to store observer update values smaller than the max update values indicate that the update value was not observed. The coefficients Bu relate to update values for which the received register status indicates that they were observed, like the recorded max update value, or observed update values smaller than the recorded max update value, according to set flags for smaller update values. Coefficients $\beta_u$ may be calculated from u=t+1 to u=(hash bits)−p, and each individual $\beta_u$ corresponds to a probability level of the stepwise approximated geometric distribution that was used for the recording of the received sketch. The calculation of those coefficients is described in more detail in FIG. 5. Variable m denotes the number of registers of the signature sketch record, as in formula [5].

The form of the simplified Log Likelihood function enables the application of standard, efficient optimization methods, like the secant method. In addition, the form of the Log Likelihood method, in combination with the fact that the probability of receiving an update value is always a power of two allows the efficient calculation of $e^{-n/m2^u}$ from a known value for $e^{-n/m2^{u+1}}$, by simply squaring the known value. After maximizing the Log Likelihood function is finished, and a cardinality estimate is calculated, the estimation result may be adapted by applying correction bias. As an example, first order bias correction according to Cox and Snell may be applied, where the correction factor depends on recording parameters t and b, and on the number of registers in the sketch record. Formula may be used for the bias correction, where m denotes the number of registers of the sketch record $n_{ML}$ the cardinality estimate produced by the Max Likelihood optimization $n_{corr}$ the bias corrected cardinality estimate, and C denotes a constant depending on the recording parameters that were used to record the sketch data.

$$n_{corr} = n_{ML}\left(1 + \frac{1}{m}C\right)^{-1} \qquad [10]$$

The constant C may be calculated according to equation [11], where $\zeta$ denotes the Hurwitz Zetta function, b is calculated as $2^{2^{-t}}$ and d is the number of flags used to store indications of observed smaller update values.

$$C = (\ln(b))\left(1 + \frac{2b^{-d}}{b-1}\right)\frac{\zeta\left(3, 1 + \frac{b^{-d}}{b-1}\right)}{\left(\zeta\left(2, 1 + \frac{b^{-d}}{b-1}\right)\right)^2} \qquad [11]$$

The flow chart depicted in FIG. 4 conceptually describes the evaluation of a sketch record.

The evaluation process 400 starts with step 401 when a signature sketch record is received for evaluation. Following step 402 then applies formula [9] and calculates the numeric values for coefficients $\alpha$ and $\beta_u$. Calculation of these coefficients is described in detail in FIG. 5.

Step 403 then uses standard mathematical optimization algorithms to determine the cardinality $n_{ML}$ which is most probable for the observations described by the received signature sketch record. Optional subsequent step 404 may apply bias correction to $n_{ML}$ using formulas and [11], and step 405 may then provide the determined cardinality estimate for further processing. The process then ends with step 406.

Referring now to FIG. 5 which provides a flow chart 500 for the calculation of coefficients $\alpha$ and $\beta_u$ from a received sketch register set. Calculation starts with step 501, when a signature sketch record is received, and continues with step 502, by creating storage for $\alpha$ and $\beta_u$, where storage for $\alpha$ may hold an individual value, and storage for $\beta_u$ may be an array that stores multiple values. Step 502 may also select the first register of the received signature sketch record as current register. To calculate the contribution of a register to those coefficients, the maximum update value u stored in the register, and the flags indicating observed smaller update values may be extracted from the register. Afterwards, the geometric contribution j of the max update value of the register is calculated according to formula [12]. Note that the geometric contribution j corresponds to the NLZ value used in formula [3] to calculate update value candidates.

$$j = \min\left(64 - (\text{hash bits}), t + 1 + \frac{\lfloor u - 1 \rfloor}{2^t}\right)$$ [12]

The calculated geometric contribution is then used to increment coefficient $\alpha$ according to formula [13].

$$\alpha = \alpha + \frac{2^t(1 - t + j) - u}{2^t}$$ [13]

Steps 503 to 505 may extract update value u from the current register, calculate geometric contribution j, and increment the value of a as described above.

Following decision step 506 then determines whether u for the current register is greater than 0. If the extracted max update value u is greater than 0, step 507 is executed, in which coefficient $\beta_j$ is incremented by 1 (i.e., in the array holding the values for coefficients $\beta$, the array element at index j is incremented by 1). Otherwise, the process continues with step 517, which fetches the next register of the signature sketch record.

If u for the current register is greater than 0, decision step 508 is executed after step 507, which determines whether u is also greater than 1. If u is not greater than 1, the process continues with step 517 to fetch the next register. In case the extracted max update value is also greater than 1, also the flags indicating observed smaller update values are evaluated to update coefficients $\alpha$ and $\beta_u$. First, the update value that is represented by a specific flag is determined, as an example, those flags may be numbered from 1 to n, and the number of the flag indicates the difference between the stored max update value and the observed update value represented by a specific flag bit. In this case, the update value represented by a flag may be calculated by subtracting the number/index of the flag from the stored max update value. In this case, the first flag would represent the observation state of an observed update value that equals max update value −1, the second flag an observed update value that is max update value −2 and so on. For each flag, the representing observed update value may be determined, and the value of the flag (true or false) may be determined. For a represented update value k, the geometric contribution j is calculated using equation [12], where the value of the represented update value k is used instead of the recorded max update value u. Step 509 may select the first flag bit (i.e., the one representing an observed update value of max update value −1) as current flag bit, and following step 510 may then determine the value k represented by the current flag bit (i.e., step 510 may subtract the index number of the current flag bit from the max update value u of the current register). Then, step 511 may calculate the geometric contribution j for k and following decision step 512 may determine whether the value of the current flag indicates that the update value represented by the flag was observed.

In case the current flag indicates a not observed update value (value of flag is "false"), coefficient $\alpha$ is incremented by $\frac{1}{2^j}$ in step 514. Otherwise, if the represented update value was seen, the value of $\beta_j$ is incremented by 1 in step 513. Decision step 515 is executed after step 513 or 514 and determines whether a next flag is available for the current register. If a next flag is available, step 516 is executed, which sets the next flag as current flag, and the process continues with step 510. If no next flag is available for the current register, the process continues with decision step 517, which determines whether a next register is available in the received signature sketch record. In case a next register is available, step 518 is executed, which sets the next register as current register and then continues with step 503. If otherwise no next register is available, the process continues with step 519, which provides the calculated coefficient values for a and Bu for subsequent processing, like the calculation of a cardinality estimate using the Max Likelihood method as described in FIG. 4. The process then ends with step 520.

To calculate coefficients $\alpha$ and $\beta_u$, besides relatively fast addition and subtraction operations, only multiplications with or divisions by powers of two are required. Those multiplications and divisions can be resolved highly efficient using bit shift operations. In addition, only fast integer increments are required for the calculation of coefficients $\beta_u$. All contributions to the coefficient $\alpha$ are integer multiples of $\frac{1}{2}^{(hash\ bits)-p}$. Therefore, by scaling those contributions up by the factor $2^{(hash\ bits)\ p}$, the upscaled contributions may be accumulated using integer additions. After all contributions are aggregated, the result may be casted to a floating-point type and afterwards be scaled down by the factor $2^{(hash\ bits)-p}$ to get the final value of $\alpha$.

Theoretical analysis of the information densities of different parametrizations of the sketch recording process, and experiments revealed some interesting and promising configurations, as they provide high information density of recorded sketches, and also result in register sizes that match well with common register sizes of computer systems which are typically a multiple of 8.

For two-byte (16 bit) sketch registers, a configuration that is near the theoretical optimal information density is using 7 bits for the storage of the max update value, where 6 of those bits represent a geometrically distributed random value and the remaining one bit represents a uniformly distributed random value. The remaining 9 bits are used as flags for observed update values that are smaller than the max update value. For three-byte registers, using 8 bits for storing the max update value, where two of those 8 bits representing a uniformly distributed random value and the other six bits of those 8 bits represent a geometrically distributed random value, and where the remaining 16 bits are used as flags for smaller update values leads to very good information density values. For four-byte sketch registers, the same configuration for storing the max update values as for three-byte registers (6 bits for geometrically distributed random value and two bits for uniformly distributed random value) combined with using the remaining 24 bit as flags for smaller update values provides very good information density values.

Sketch registers with 28 bits (3½ bytes) represent an interesting compromise between computer-architectural register alignment and information density. A parametrization which again uses 8 bits for max update value storage (again 6 bits for geometrically distributed contribution and 2 bits for uniformly distributed contribution), while 20 bits are used as flags for smaller update values shows information density values that are superior to above configurations for 2- and 3-byte registers. Addressing individual 3½ bytes sketch registers may be not as performant as addressing sketch registers that align to byte boundaries, but the performance penalty should not be too high, as each pair of 3½ byte registers again aligns with the byte boundaries.

Coming now to FIG. 6, which provides an exemplary conceptual application of the proposed sketching algorithm and data structure for the fast and space efficient estimation of set cardinalities.

Monitoring data records 602 may be created by monitoring data sources like agents or monitoring APIs 601 that are deployed to a monitored environment 600. Those data records may be sent 603 to a monitoring server 610, where they may be received by a monitoring data receiver 611 and used by a sketch recorder 614 to update 616 a sketch data record 617. Optionally, the received data records may also be stored 613 in a monitoring data repository 615 residing at the monitoring server. A cardinality estimator 619 may receive cardinality estimation requests 620 and access and evaluate 618 the sketch data record to calculate a cardinality estimation and to provide this cardinality estimation in form of a response 621 to the cardinality estimation request.

On receipt 612 of a monitoring data record, the sketch recorder 614 may first generate a random bit sequence 631 from the received monitoring data record. Generation of the pseudo random bit sequence may be performed using a hash function or a pseudo random number generator 630. Prerequisites for the creation process of the random bit sequences include that the random bit sequences are uniformly distributed, and that the creation process is idempotent, i.e., when the same input data (i.e., same data record) is applied multiple times for the random bit sequence generation, then identical random bit sequences are generated for each application of the input data. For a hashing-based approach, an input value for hashing function may be derived from a received monitoring data record and this input value may be applied to the hashing function to create a random bit sequence. For a pseudo random number generator approach, a numeric value may be derived from a received monitoring data record (e.g., by using a hash function) and then the numeric value may be used as seed value of the pseudo random number generator, which may then be used to create a random bit sequence for the monitoring data record.

The whole content of received monitoring data records, or only portions of it may be used for creation or definition of the set for which a cardinality estimate is desired. As an example, monitor data records may describe web-browse based interactions of customers with an application, and the data records may contain an identifier for interacting customers, and geolocation data for the location of the web-browser which was used for the interaction. If an estimate for the number of different users interacting with the application is desired, then user identification data may be extracted from received monitoring data and used for the random bit sequence generation. If otherwise an estimation for the number of different geolocations from which users interact is desired, data for the browser geolocation may be extracted and used for random bit sequence generation.

The created random bit sequences may be forwarded 632 to an update value calculator 634 and to a sketch register selector 635, which may use distinctive, non-overlapping portions of the random bit sequence to generate a register address 637 and an update value candidate 636 for the selected register. Register update value and register address may then be used by a sketch register updater module 638, to first select the register 217 of the sketch record 617 addressed by the received register address 651, read the max update value 652 currently stored in this register, compare it with the received update value, and then update the selected sketch register according to the result of this comparison. Calculation of update value and register address by sketch register selector and update value calculator may be performed as described in FIG. 2, and the update of a selected sketch register may be performed as described in FIG. 3 and may include the update of max value 652 and of one or more of the lower value flags 653 of the selected register.

The cardinality estimator 619 may, on receipt of a cardinality estimation request 620, fetch all registers 207 of the sketch data record 617, and forward the fetched registers to a coefficient calculator 640, which uses the registers to calculate the coefficients $\alpha$ and $\beta_u$ as described in FIG. 5. The calculated coefficients are sent 641 to a Max Likelihood Optimizer 642, which uses the received coefficients in combination with equation [9] to calculate cardinality which has the highest probability for the observations recorded in the registers of the sketch record. The cardinality estimation result may be forwarded 643 to bias correction unit 644 for further adaptation and improved, before it is forwarded to the sender of the cardinality estimation request in form of a cardinality estimation response 621.

In earlier research work, the inventor proposed a similar sketching data structure and recording method, where a geometrically distributed random number, derived from the numbers of leading zeros of a random bit sequence, is used to determine update value candidates for registers, instead of a random number that follows stepwise geometric distribution as proposed here.

The probability density function for register values for this earlier approach is as described in equation [14].

$$\rho_{reg}\left(r|n\right) = Pr\left(r_i = r\right) = \begin{cases} z_0^{\frac{1}{b-1}}; & r = 0, \\[2ex] z_u^{\frac{1}{b-1}}(1 - z_u)\prod_{j=1}^{u-1} z_{u-j}^{1-l_j}(1 - z_{u-j})^{l_j}; & r = u2^d + \langle l_1 \ldots l_{u-1}\rangle_2 2^{d+1-u}, 1 \le u \le d, \\[2ex] z_u^{\frac{1}{b-1}}(1 - z_u)\prod_{j=1}^{d} z_{u-j}^{1-l_j}(1 - z_{u-j})^{l_j}; & r = u2^d + \langle l_1 \ldots l_{u-1}\rangle_2, d + 1 \le u < w, \\[2ex] \left(1 - z^{\frac{1}{w-1b-1}}\right)\prod_{j=1}^{d} z_{w-j}^{1-l_j}(1 - z_{w-j})^{l_j}; & r = w2^d + \langle l_1 \ldots l_{u-1}\rangle_2, \\[2ex] 0; & \text{else.} \end{cases}$$ [14]

Where $z_u$ is given by equation [15].

$$z_u := e^{-\frac{n(b-1)}{mb^u}}$$ [15]

In equations and [15], m denotes the number of registers in the sketching data structure, u denotes the max update value stored in a given register, $l_j$ denotes the value of bit j of the given register, where "true" maps to 1 and "false" maps to 0, b denotes the base of a geometric distribution as described in equation [1], and w is the maximum value of an observed max update value that can be stored in a register. It should be noted that this earlier register probability mass function is equivalent to the one described in equation [8] for b=2 and t=0, and that the representation of the register probability mass function of equation can be transformed to the form described in equation [8] if b=2.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for estimating cardinality of a data set, comprising:

providing a probabilistic data structure, where the probabilistic data structure is partitioned into a plurality of registers and each register is comprised of q+d bits, where q bits are used to store an update value, d bits are used to indicate whether there have been any updates with values within a range of the update value, and d is an integer more than two;

receiving, by a computer processor, a data set;

for each data element, determining, by the computer processor, an update candidate for the probabilistic data structure using a HyperLogLog method, where b is a recording parameter that controls recording of data into the probabilistic data structure;

updating, by the computer processor, a given register of the probabilistic data structure with the update candidate, where updating includes setting the q bits of the given register to the update candidate in response to value of the update candidate exceeding the update value stored in the q bits of the given register, where the updating of the given register further includes setting the d bits of the given register based on the update candidate; and estimating, by the computer processor, cardinality of the data set using data stored in the probabilistic data structure.

2. The method of claim 1 wherein each of the d bits of a register in the probabilistic data structure specifies a different range from the update value.

3. The method of claim 1 wherein determining an update candidate for the probabilistic data structure includes computing a hash value for a given data element using a hash function;

selecting a register from the plurality of registers using a first subset of bits comprising the hash value; and calculating a new update value for the selected register using a second subset of bits comprising the hash value.

4. The method of claim 3 wherein determining an update candidate for the probabilistic data structure further includes storing the new update value in the selected register in response to the new update value being larger than the update value stored in the selected register;

calculating a difference between the new update value and the update value stored in the selected register;

setting the d bits of the given register based on the update candidate in response to the difference being equal to or smaller than largest range indicated by one of the d bits; and resetting the d bits of the selected register in response to the difference being larger than largest range indicated by one of the d bits.

5. The method of claim 1 further comprises estimating cardinality of the data set using maximum likelihood estimation.

6. The method of claim 5 further comprises estimating cardinality of the data set from the probabilistic data structure with the assumption that the update values of registers comprising the probabilistic data structure are statistically independent and by determining probability of the update value stored in each register in the probabilistic data structure, multiplying the probabilities for each of the registers together to yield an overall probability, varying cardinality for the data set until the overall probability is maximized, and selecting the cardinality value that corresponds to the overall maximized probability as estimate for the cardinality.

7. The method of claim 6 wherein probability for a given register in the probabilistic data structure is given by $$z_0^{\frac{1}{b-1}}$$

for the given register containing the value 0

$$z_u^{\frac{1}{b-1}}(1-z_u)\prod_{j=1}^{u-1} z_{u-j}^{1-I_j}(1-z_{u-j})^{I_j}$$

for the given register containing an update value greater than 1 and smaller than or equal to d;

$$z_u^{\frac{1}{b-1}}(1-z_u)\prod_{j=1}^{d} z_{u-j}^{1-I_j}(1-z_{u-j})^{I_j}$$

for the given register containing an update value greater than d and smaller than the maximum update value w that the register can store;

$$\left(1-z_{\omega-1}^{\frac{1}{b-1}}\right)\prod_{j=1}^{d} z_{\omega-j}^{1-I_j}(1-z_{\omega-j})^{I_j}$$

for the given register containing an update value that is equal to the maximum update value w that the register can store;

where $$z_k := e^{-\frac{n(b-1)}{mb^k}}\,;$$

where m denotes the number of the registers in the data structure, u denotes the update value stored in the given register, $I_j$ denotes the value of bit j of the given register, where "true" maps to 1 and "false" maps to 0, and where the recording parameter b denotes the success probability of a geometric distribution that is used to generate the update candidate from the data element.

8. The method of claim 1 further comprises estimating cardinality of the data set from the probabilistic data structure with the assumption that the update values of registers in the probabilistic data structure are statistically independent and according to $$\hat{n} = m^{1+\frac{1}{\tau}}\left(\sum_{i=0}^{m-1} g(r_i)\right)^{-\frac{1}{\tau}}\left(1+\frac{1+\tau}{2}\frac{v}{m}\right)^{-1};\ \text{where}$$

$$g(r) := \frac{(b-1+b^{-\tau})^\tau \ln(b)}{\Gamma(\tau)} b^{-\tau u}\left(\frac{1}{b^\tau-1}+\sum_{s=1}^{d}(1-I_s)\,b^{s\tau}\right),\ \text{and}$$

$$v = \frac{1}{\tau^2}\left[\frac{\ln(b)\,\Gamma(2\tau)}{(\Gamma(\tau))^2}\left(1+\frac{2b^{-\tau d}}{b^\tau-1}+\sum_{s=1}^{d}\frac{2b^{-\tau s}}{\left(1+\frac{(b-1)b^{-s}}{b-1+b^{-d}}\right)^{2\tau}}\right)-1\right];$$

where m denotes the number of the registers in the data structure, u denotes the update value stored in the given register, $I_s$ denotes the value of bit s of the given register, where "true" maps to 1 and "false" maps to 0, where the recording parameter b denotes the success probability of a geometric distribution that is used to generate the update candidate from the data element, v defines the variance of the estimator, T denotes a free parameter greater than 0, where the chosen value of T minimizes variance v, where ln denotes the natural logarithm function, and $\Gamma$ denotes the gamma function.

9. The method of claim 1 wherein the probabilistic data structure is defined such that q is 6, d is 2, b is 2.

10. The method of claim 1 wherein the probabilistic data structure is defined such that q is 7, d is 9, b is square root of 2.

11. A computer-implemented method for estimating cardinality of a data set, comprising:

providing a probabilistic data structure, where the probabilistic data structure is partitioned into a plurality of registers and each register is comprised of q+d bits, where q bits are used to store an update value, d bits are used to indicate whether there have been any updates with values within a range of the update value, and d is an integer more than two;

receiving, by a computer processor, a data set;

for each data element, determining, by the computer processor, an update candidate for the probabilistic data structure by computing a hash value for a given data element using a hash function, selecting a register from the plurality of registers using a first subset of bits comprising the hash value, calculating a new update value for the selected register using a second subset of bits comprising the hash value, storing the new update value in the selected register in response to the new update value being larger than the update value stored in the selected register, and setting the d bits of the selected register based on the new update value; and estimating, by the computer processor, cardinality of the data set using data stored in the probabilistic data structure.

12. A computer-implemented method for estimating cardinality of a data set, comprising:

providing a probabilistic data structure, where the probabilistic data structure is partitioned into a plurality of registers, where a first portion of a given register is used to store a max update value and a second portion of the given register is used to store at least one indicator flag, where a given indicator flag represents an update value smaller than the max update value stored in the given register, and where the value of the given indicator flag indicates if the represented smaller update value was received for the given register;

receiving, by a computer processor, a data set;

for each data element in the data set, determining, by the computer processor, a register address identifying a given register, and an update value candidate for the register;

where determining the register address and the update value candidate comprises determining, by the computer processor, a random number for a given data element;

selecting a first portion of the random number to address a register;

selecting a second portion of the random number to generate a geometrically distributed random number;

selecting a third portion of the random number to generate a uniformly distributed random number;

generating the update value candidate by multiplying the geometrically distributed random number with a factor derived from the subset of the random number used to create the uniformly distributed random number and adding the uniformly distributed random number to the result of the multiplication;

comparing, by the computer processor, the update value candidate with the max update value stored in the addressed register;

in response to the update value candidate exceeding the max update value stored in the addressed register, updating the max update value stored in the addressed register to the update value candidate; and updating, by the computer the at least on indicator flags of the addressed register to represent update values smaller than the stored max update value, where updating the indicator flags includes updating an individual indicator flag if the update value candidate is smaller than the max update value stored in the addressed register and in the range of smaller update values represented by the indicator flags; where updating the indicator flags includes shifting the values of indicator flags if the update value candidate is greater than the max update value stored in the addressed register;

evaluating, by the computer processor, the probabilistic data structure to produce an estimate for the cardinality of the data set.

13. The method of claim 12 further comprises estimating cardinality of the data set using maximum likelihood estimation.

14. The method of claim 13 further comprises estimating cardinality of the data set from the probabilistic data structure with the assumption that the values of registers comprising the probabilistic data structure are statistically independent and by determining probability of the value stored in each register in the probabilistic data structure, where the probability is depending on the cardinality, multiplying the probabilities for each of the registers together to yield an overall probability, varying cardinality for the data set until the overall probability is maximized, and selecting the cardinality value that corresponds to the overall maximized probability as estimate for the cardinality.

15. The method of claim 14, where bias correction is applied to the selected cardinality value, where a bias corrected cardinality estimate $n_{corr}$ is calculated $$n_{corr} = n_{ML}\left(1 + \frac{1}{m}C\right)^{-1};$$

where $n_{ML}$ represents the cardinality estimate produced by the Max Likelihood optimization, m represents the number of registers and C is calculated as $$C = (\ln(b))\left(1 + \frac{2b^{-d}}{b-1}\right)\frac{\zeta\left(3, 1 + \frac{b^{-d}}{b-1}\right)}{\left(\zeta\left(2, 1 + \frac{b^{-d}}{b-1}\right)\right)^2};$$

where $\zeta$ denotes the Hurwitz Zetta function and b has the value $2^{2^{-t}}$.

16. The method of claim 14 wherein probability for a given register in the probabilistic data structure is given by $$e^{-\frac{n}{m}}$$

for the given register containing the max update value 0;

$$\left(1 - e^{-\frac{n}{m}\rho_{update(u)}}\right)e^{-\frac{n}{m}f(u)} * \prod_{j=1}^{u-1}\left(e^{-\frac{n}{m}\rho_{update}(u-j)}\right)^{1-I_j}\left(1 - e^{-\frac{n}{m}\rho_{update}(u-j)}\right)^{I_j} \quad 5$$

for the given register containing a max update value greater than 1 and smaller than or equal to d; and $$\left(1 - e^{-\frac{n}{m}\rho_{update(u)}}\right)e^{-\frac{n}{m}f(u)} * \prod_{j=1}^{d}\left(e^{-\frac{n}{m}\rho_{update}(u-j)}\right)^{1-I_j}\left(1 - e^{-\frac{n}{m}\rho_{update}(u-j)}\right)^{I_j}$$

for the given register containing a max update value greater than d and smaller than or equal to the maximum value of the max update value that the register can store;

where function f(u) is given as $$f(u) := \sum_{k=u+1}^{((hash\ bits)-p-t)2^t} \rho_{update(k)} =$$

$$\begin{cases} \dfrac{2^t\left(2 + \lfloor(u-1)/2^t\rfloor\right) - u}{2^{t+1+\lfloor(u-1)/2^t\rfloor}}, & 0 \le u \le ((hash\ bits) - p - t)\,2^t \\ \dfrac{((hash\ bits) + 1 - p - t)\,2^t - u}{2\,(hash\ bits) - p}, & ((hash\ bits) - p - t)\,2^t < u \le ((hash\ bits) + 1 - p - t)\,2^t \end{cases}$$

and $\rho_{update}(k)$ is given as $$\rho_{update}(k) = \begin{cases} \dfrac{1}{2^{t+1+\lfloor(k-1)/2^t\rfloor}} & 1 \le k \le ((hash\ bits) - p - t)\,2^t \\ \dfrac{1}{2^{(hash\ bits)-p}} & ((hash\ bits) - p - t)\,2^t < k \le ((hash\ bits) + 1 - p - t)\,2^t \\ 0 & else \end{cases} ;$$

where m denotes the number of the registers in the data structure, u denotes the max update value stored in the given register, $I_j$ denotes the value of bit j of the given register, where "true" maps to 1 and "false" maps to 0, hash bits denotes the number of bits of the random number random, p denotes the number of bits of the random number used to address a given register and t the number of bits of the random number to create a uniformly distribute random number.

17. The method of claim 16 wherein probability where the function used for the max likelihood estimation is given as $$\ln \mathcal{L} = -\frac{n}{m}\alpha + \sum_{u=t+1}^{(hash\ bits)-p} \beta_u \ln\left(1 - e^{-\frac{n}{m2^u}}\right);$$

where values for the coefficients $\alpha$ and $\beta_u$ are calculated from register values of registers of the probabilistic data structure.

18. The method of claim 17, where calculating the contribution of the given register to coefficients $\alpha$ and $\beta_u$ includes extracting the max update value stored in the register and determining a geometric contribution j of the update value, where the geometric contribution j is calculated as $$j = \min\left(t + 1 + \lfloor(u-1)/2^t\rfloor,\ (hash\ bits) - p\right);$$

where u is the stored max update value, t is the number of bits used to create the uniformly distributed random value, hash bits is the number of bits of the random number, and p is the number of bits of the random number that are used to address the given register; where the geometric contribution is used to address a particular coefficient $\beta_i$, where the addressed coefficient $\beta_i$ is incremented by 1; where the geometric contribution is further used to increment coefficient $\alpha$ by the value $$\frac{2^t(1 - t + j) - u}{2^j}.$$

19. The method of claim 18, where calculating the contribution of the given register further includes, evaluating the indicator flags of the given register to determine values of observation state of smaller update values; where calculating the contribution includes, for a given smaller update value represented by a given indicator flag, determining the geometric contribution js for the given smaller update value, where the geometric contribution js is calculated as $$js = \min\left(t + 1 + \lfloor(u-1)/2^t\rfloor,\ (hash\ bits) - p\right);$$

where the $\alpha$ is increased by the value $\frac{1}{2}^{js}$ in response to the given indicator flag indicating that the given smaller update value was not observed; and where $\beta_{js}$ is incremented by 1 in response to the given indicator flag indicating that given smaller update value was observed.

20. The method of claim 19 where calculating the value of coefficient $\alpha$ includes scaling contributions to $\alpha$ up by $2^{(hash\ bits)-p}$ and scaling the final result of coefficient $\alpha$ down by $2^{(hash\ bits)-p}$.

21. The method of claim 20, where the multiplications and divisions by powers of two are implemented using bit shift operations.

* * * * *